INVENTORS.
RICHARD F. POST
CLYDE E. TAYLOR
BY
ATTORNEY.

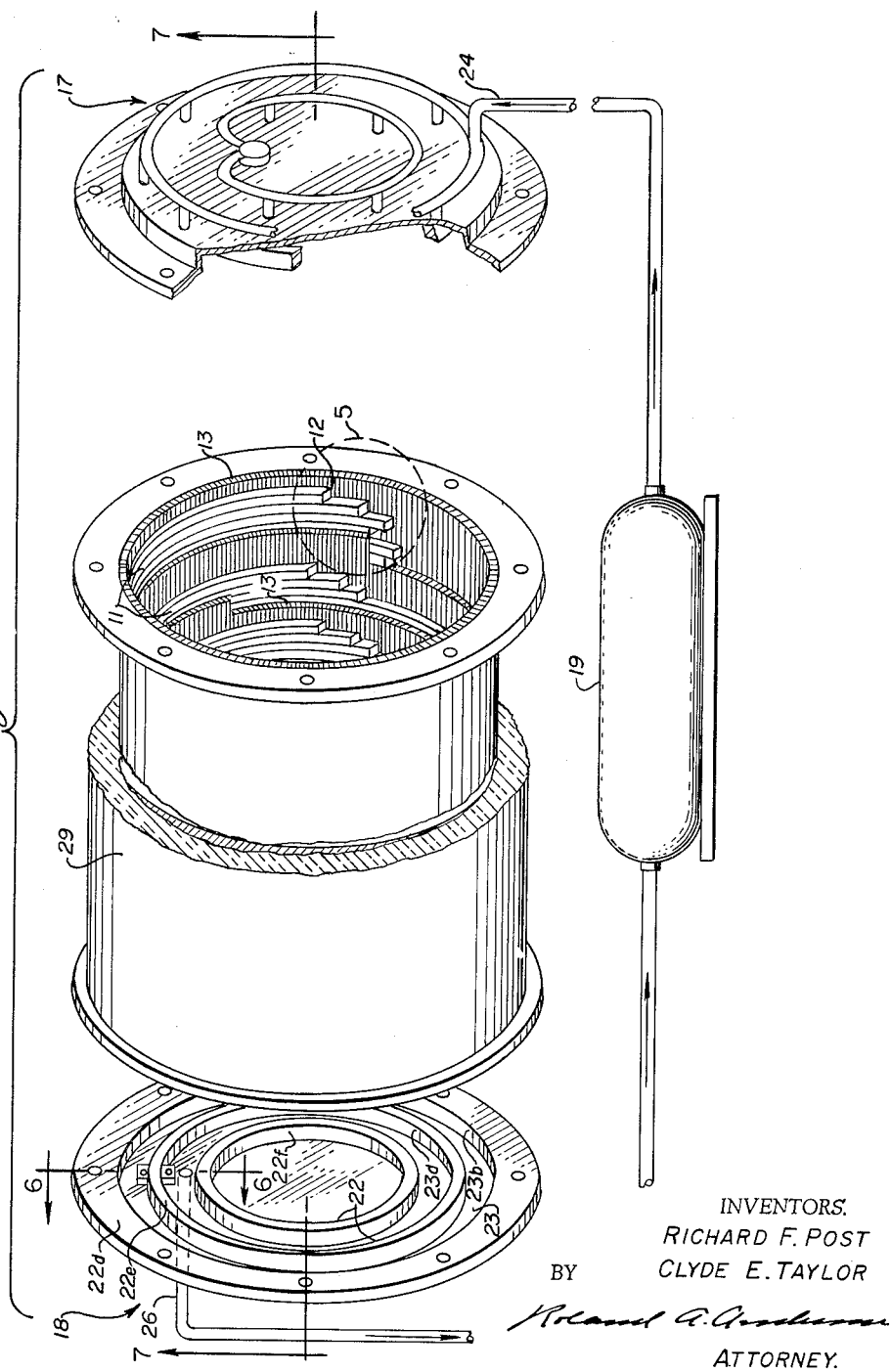

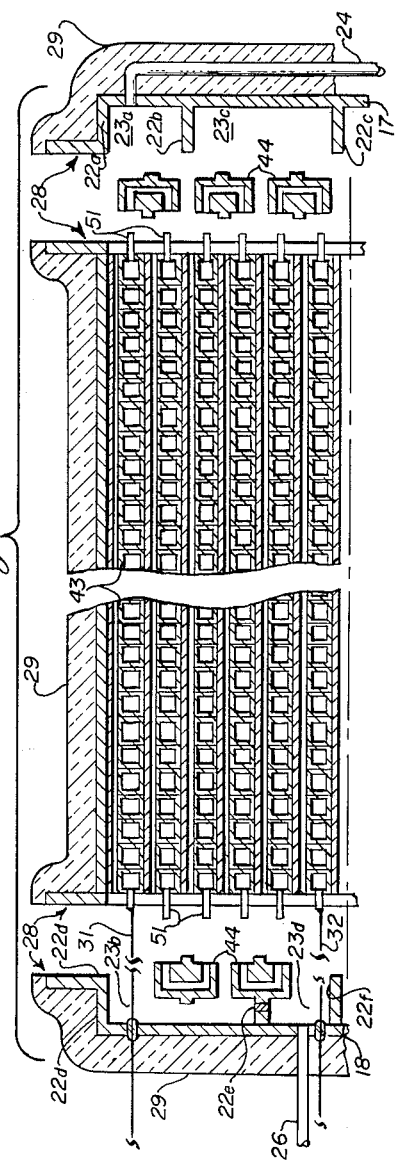
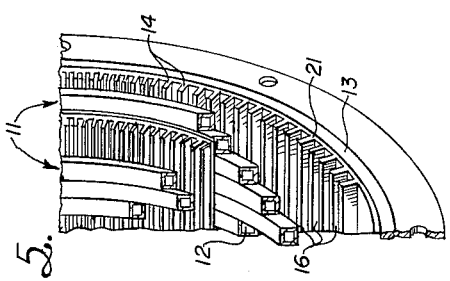
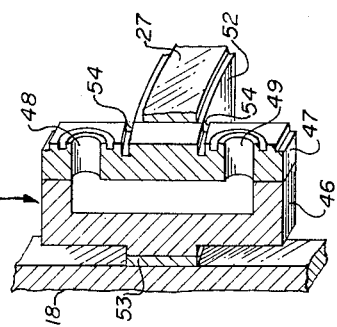
INVENTORS.
RICHARD F. POST
CLYDE E. TAYLOR
BY
ATTORNEY

United States Patent Office 3,090,894
Patented May 21, 1963

3,090,894
CRYOGENIC MAGNETS
Richard F. Post, Walnut Creek, and Clyde E. Taylor, Livermore, Calif., assignors to the United States of America as represented by the United States Atomic Energy Commission
Filed Dec. 28, 1959, Ser. No. 862,433
11 Claims. (Cl. 317—158)

The present invention relates to the generation of high magnetic fields and is particularly directed to a cryogenic magnet coil for generating extremely high magnetic fields with a minimum expenditure of coil input energy.

In the field of high energy nuclear physics it has become of importance to generate extremely high magnetic fields. In very high energy particle accelerators and related activities, as well as in controlled fusion research, magnetic fields of the order of 100,000 gauss are often desirable. Since ferromagnetic materials are unsuited to the generation of fields of this order of intensity, air core coils wherein the desired field strength depends only on the achievable ampere-turns and simple geometrical factors are required for the generation of such fields. However, the power requirements for the generation of very high magnetic fields with conventional air core coils are so large as to be impractical. This is due in large part to the energy undesirably expended in the resistive heating of the coil conductors. In addition to the limitations in the efficiency of field generation attributable to the resistive heating, severe heat transfer problems within the coil are thereby posed.

It has long been recognized that one solution to the problem of very high intensity magnetic field generation is to operate the field generating coil at very low temperatures whereat the electrical resistivity of the conductor material drops to a small fraction of its value at room temperature. The correspondingly large reduction in the volume resistivity of the coil hence correspondingly reduces the amount of energy uselessly expended as heat in the windings. At low temperatures, however, other factors may seriously detract from the advantages gained by the reduction in coil dissipation. More particularly, as has been the case with previous laboratory scale cryogenic coils, the energy lost irreversibly in running the coil refrigeration plant may more than offset the reduction in coil losses such that a greater overall expenditure of power is required to generate a magnetic field of given intensity with a coil operated at a low temperature than with one operated at room temperature.

We have found that a substantial reduction in the power requirements of generating very high magnetic fields is attained by scaling the field generating coil to large size, employing an appropriate conductor material, and operating the coil at a predetermined optimum temperature commensurate with minimum overall power requirements. In accordance with the foregoing, there is provided by the present invention a cryogenic magnet of unique construction as arranged to efficiently generate very high magnetic fields of the order of 100,000 gauss.

It is therefore an object of the present invention to provide for the efficient low temperature generation of magnetic fields at high field strengths.

Another object of the invention is to provide a cryogenic coil construction having provision for the cooling of the coil conductors with optimum efficiency.

Still another object of our invention is to maintain the operating temperature of a coil of the class described at a predetermined optimum value commensurate with minimum input power.

A further object of this invention is to provide a gas-cooled coil structure which may be constructed by a relatively simple method of manufacture.

Other objects and advantages of the invention will become apparent by consideration of the following description taken in conjunction with the accompanying drawing, of which:

FIGURE 4 is a disassembled perspective view with portions in broken out section of preferred structure of the cryogenic coil of the present invention;

FIGURE 5 is an enlarged broken out portion of FIGURE 4 illustrating particularly the coolant passages of the coil;

FIGURE 6 is an enlarged sectional view taken at line 6—6 of FIGURE 4 and illustrating particularly the structure of jumpers for connecting adjacent layers of the coil conductor;

FIGURE 7 is a half-section view of the coil taken at a plane through the axis and illustrating particularly the manifolds of the coil.

Figure 3:
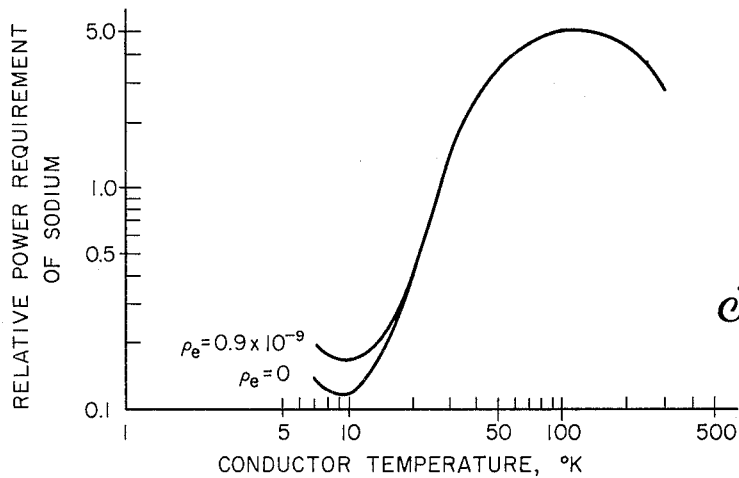
FIGURE 3 is a graph similar to FIGURE 1, but for a sodium conductor coil.

Considering now the invention as to its general aspects and referring to the drawings, there is seen to be provided a gas-cooled coil structure of novel configuration together with means for operating the coil at predetermined low optimum temperatures commensurate with a minimum expenditure of overall input power. The coil comprises a helical winding which is preferably arranged in radially stacked layers and is in thermal contact with wall structure defining a plurality of coolant passages. The winding conductor is a material having a low intrinsic resistance, low magneto-resistance coefficient, and low impurity resistance at low temperatures and high magnetic field strengths whereby at low temperatures the total resistivity is a small fraction of its value at room temperature. In addition, the coil is of such a size that the resulting volume resistivity losses of the coil winding of given low resistivity material are reduced upon passing coolant through the passages by an amount substantially greater than the energy expended in maintaining the coolant at a sufficiently low operating temperature to produce the reduction in resistivity losses. In other words, in order that a net reduction in energy losses over those occurring in the coil at room temperature be achieved, the energy lost irreversibly in running the coolant refrigeration plant plus the coil dissipation at the low operating temperature is materially less than the coil dissipation at room temperature.

Considering now more specifically the energy losses in the coil of the present invention and the selection of suitable conductor materials, optimum operating temperatures, and coil size, it is first to be noted that when a coil winding is operated at very low temperature, the power required by the refrigeration equipment in extracting heat from the coil is larger than the electrical power supplied to the coil. The total power requirement is the sum of refrigerator and magnet power. For an ideal refrigerator, the ratio, R, of refrigerator power input to rate of heat absorption at low temperature is given by:

$$R = \frac{T_h - T_o}{T_o}$$

where $T_h$=heat rejection temperature and $T_o$=temperature at which heat is absorbed, viz., the operating temperature of the coil.

For an actual refrigerator, $$R = \frac{1}{\eta} \frac{T_h - T_o}{T_o}$$

$\eta$ being the refrigerator efficiency.

The rate of heat production, $p$, in the winding of the coil is:

$$p = \frac{I^2 \rho_t L}{A}$$

where:
$I$ = coil current
$\rho_t$ = total resistivity of conductor metal
$L$ = length of conductor
$A$ = cross-sectional area of conductor.

In steady-state operation, the electrical power supplied to the coil is equal to the heat production rate, which is the refrigerator load. Therefore, the total power, $P$, required to operate the coil at low temperature, $T_o$, is:

$$P = p(1+R) = \frac{I^2 \rho_t(T_o) L}{A}\left(1 + \frac{1}{\eta}\frac{T_h - T_o}{T_o}\right)$$

$\rho_t(T_o)$ being the total resistivity evaluated at temperature, $T_o$.

For purposes of evaluating comparative power requirements for coils producing identical fields with identical geometry, the above expression is simplified as follows:

$$P = K\rho_t(T_o)\left(1 + \frac{1}{\eta}\frac{T_h - T_o}{T_o}\right) = K\rho_t(T_o) G_R$$

where $K$ = a constant of proportionality equal to $I^2 L/A$, and $G_R$ = a refrigeration factor equal to $$\left[1 + \frac{1}{\eta}\frac{T_h - T_o}{T_o}\right]$$

The foregoing expression is advantageously compared against a standard to determine the reduction in overall power requirement achievable by refrigeration of various conductor materials. Since coil windings are usually made of copper and usually operate at ambient temperature, the standard is herein taken as pure copper having a resistivity of $1.73 \times 10^{-6}$ ohm-cm. at ambient temperature of 300° K. Such standard resistivity is designated as $\rho_s$ and the ratio $\rho_t(T_o)/\rho_s G_R$ may hence be evaluated as a function of temperature for any pure metal (including copper itself) to provide a criterion for selection of suitable conductor materials as well as optimum operating temperature for the coil. It will be appreciated that any metal for which the resistivity does not drop to a value less than $1/G_R \rho_s$ at low temperature cannot provide a reduction in power losses of the coil. Hence, conductor materials employed in the coil of the present invention are selected to have resistances which at low temperature drop to values substantially less than the foregoing value.

In addition to the reduction in overall power requirement attributable to the employment of suitable conductor material and operation of the coil at corresponding optimum low operating temperature, our coil is also of optimum dimensional proportions to produce a given field with a minimum power expenditure. In this regard, it can be shown that the current density, $j$, required to produce a given magnetic field density, $B$, at the center of a coil is given by:

$$j = \frac{B}{\mu_o \gamma a_1 c}$$

where:
$\mu_o$ = free space magnetic permeability
$a_1$ = inside radius of coil
$\gamma$ = packing fraction
$c$ = geometric constant depending on coil proportions
An approximate equation for $c$ is:

$$c = \beta(\alpha - 1)/\sqrt{(1+\alpha)^2 + \beta^2}$$

where:
$\alpha = a_2/a_1$
$\beta = Z/a_1$
$a_2$ = outside coil radius
$Z$ = coil length The heat, $Q$, generated per unit total coil volume is $Q = j^2 \bar{\rho} \gamma$, $\bar{\rho}$ being average resistivity.

Hence, the power required is $$P = \frac{\beta^2 \bar{\rho} a_1}{\mu_o^2 \gamma}\left[\frac{\pi\beta(\alpha^2-1)}{c^2}\right]$$

From the latter equation, it can be shown that the coil proportions resulting in a minimum total power for a given inside radius $a_1$ and central field are $\alpha = 3$ and $\beta = 4$. In other words, the outside coil diameter is three times the inside diameter and the coil length is twice the inside coil diameter.

Considering now more particularly the total resistivity, $\rho_t$, and the selection of suitable conductor materials and optimum operating temperatures, the total resistivity of a metal can be expressed as the sum of two parts, one of which is due to the magnetic field in the winding, viz., magnetoresistivity, and the other of which is independent of magnetic field. Thus: $\rho_t = \rho_m + \rho_o$ where $\rho_m$ = magnetoresistivity and $\rho_o$ = the field independent portion of the resistivity.

It can be readily shown that with the optimum coil proportions noted hereinbefore and a central field of the order of 100,000 gauss, the volume-weighted average field in the winding is approximately 40,000 gauss. Therefore, the magnetoresistivity, $\rho_m$, is evaluated for a field of 40,000 gauss in determining suitable conductor material and optimum temperatures for the coil of the present invention.

The field independent portion of resistivity, $\rho_o$, is expressible as the sum of two components: $\rho_o = \rho_i + \rho_e$, where $\rho_i$ is the intrinsic resistivity and $\rho_e$ is the impurity resistivity. The intrinsic resistivity, $\rho_i$, is characteristic of a given metal and is temperature dependent whereas the impurity resistivity, $\rho_e$, is independent of temperature and dependent on purity and the amount of cold working which has been done on the metal.

The intrinsic resistivity, $\rho_i$, at low temperature is given for most metals to close approximation from ambient temperature data by the Bloch-Gruneisen formula:

$$\rho_i \alpha T^5 \int_0^{\theta/T} \frac{Z^5 dZ}{(e^z - 1)(1 - e^z)}$$

where $T$ is the absolute temperature of the metal, $\theta$ is a characteristic temperature which is different for each metal, and $Z$ is the variable of integration.

From the foregoing considerations of total resistivity and from available data, suitable conductor metals that exhibit resistivities $\rho_t(T_o)$ at low temperatures substantially below the value $1/G_R \rho_s$ are copper, aluminum, and preferably sodium. The ratio, $\rho_t(T_o)/\rho_s G_R$, of previous mention is plotted as a function of temperature in FIGURES 1, 2, and 3 for respectively copper, aluminum, and sodium.

In the determination of the plotted data for each curve, the refrigerator efficiency $\eta$ and the sink temperature $T_h$ in the expression for $G_R$, are taken as 35% and 300° K. respectively.

Figure 1:
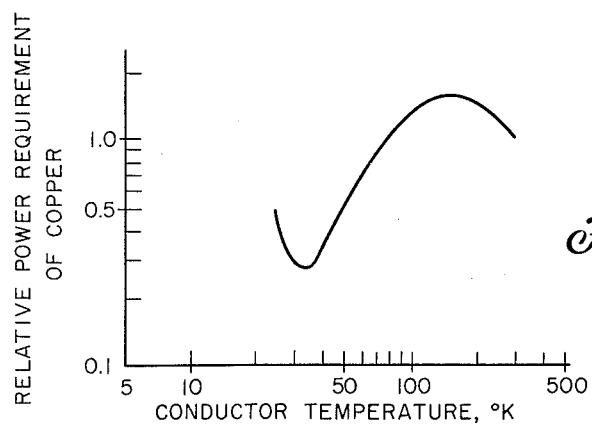
FIGURE 1 is a graph of relative power requirement of a copper conductor coil as a function of absolute temperature.
Figure 8:
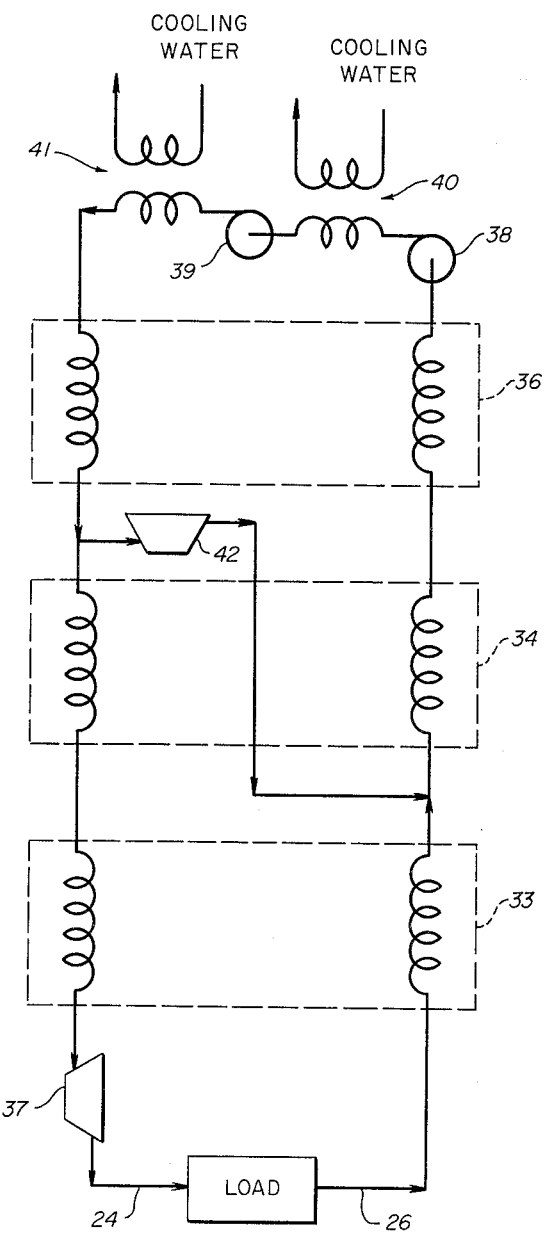
FIGURE 8 is a schematic diagram of a preferred refrigeration system for cooling the coil structure to low temperature.

As regards the resistivity data utilized in determining $\rho_t$ for the values of the copper curve appearing in FIGURE 1, a characteristic temperature of 333° K. and resistivity at 273° K. of $1.55 \times 10^{-6}$ ohm-cm. are utilized in conjunction with the Bloch-Gruneisen formula to determine the intrinsic resistivity, $\rho_i$. The impurity resistivity, $\rho_e$, is taken as zero inasmuch as high purity copper is readily obtainable. The magnetoresistivity, $\rho_m$, is taken from available data.

For aluminum, the intrinsic resistivity, $\rho_i$, is taken from available data. Similarly, the impurity resistivity, $\rho_e$, is taken from available data for both zone-refined and nonzone-refined aluminum. Also, the values for magnetoresistivity, $\rho_m$, are taken from available data.

For sodium, the values of intrinsic resistivity, $\rho_i$, are derived from the Bloch-Gruneisen function with characteristic temperature, $\theta$, taken as 202° K. and resistivity at 273° K. as $4.27 \times 10^{-9}$ ohm-cm. The impurity resistivity, $\rho_e$, and magnetoresistivity, $\rho_m$, are taken from available data.

Figure 2:
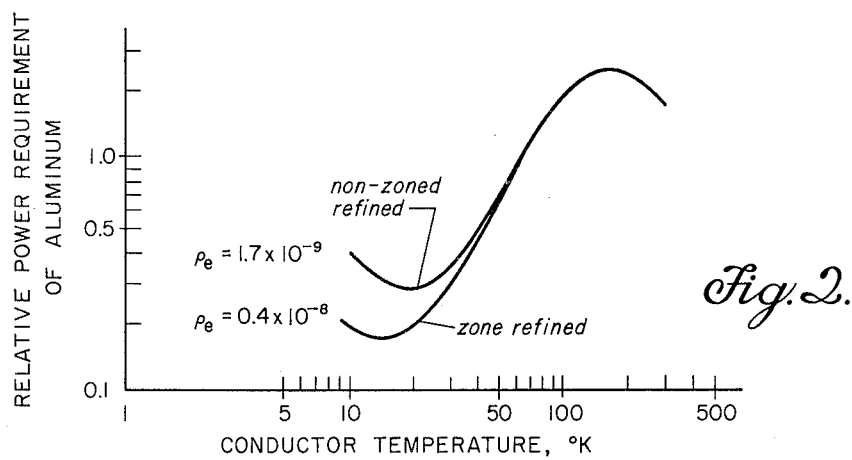
FIGURE 2 is a graph similar to FIGURE 1, but for an aluminum conductor coil.

Referring now more particularly to the curves of FIGURES 1, 2, and 3, it is to be noted that the use of copper, aluminum, or sodium conductors in the cryogenic coil of the present invention results in substantial net reductions in the overall power requirement for generating a magnetic field of the order of 100,000 gauss. For copper, the power requirement is as low as 27% of the standard requirement. For non-zone-refined aluminum, the requirement is similarly as low as 27% of the standard whereas for zone-refined aluminum the requirement is as low as 17% of the standard. For sodium, the power requirement is as low as 11% of the standard requirement.

It is particularly important to note that each of the curves of FIGURES 1, 2, and 3 exhibit minima and, for maximum reduction in input power requirement, the coils are operated at the optimum temperature, $T_o$, at which the minimum occurs for the particular curve. These temperatures for copper, aluminum, and sodium are seen to be respectively, 33° K., 20° K. (non-zone-refined), 13° K. (zone-refined), and 10° K. For other conductor materials and conditions, it will be appreciated that the optimum operating temperature is expressible as the temperature $T_o$ at which the function:

$$1 + \frac{1}{\eta} \frac{T_h - T_o}{T_o} \frac{\rho_t(T_o)}{\rho_s}$$

experiences a minimum.

From the foregoing considerations, the general parameters of a preferred embodiment of our coil structure as arranged to generate fields of the order of 100,000 gauss with a minimum expenditure of input power is as follows: The coil proportions are $\alpha=3$ and $\beta=4$, the coil conductors are high purity sodium, the operating temperature is of the order of 10° K., and the refrigeration system mechanical efficiency is at least 35%.

Considering now preferred structure of the cryogenic coil of the present invention for the efficient cooling of the coil conductors to the optimum operating temperature and rigid support of the coil conductors under the tremendous magnetic forces generated at the extremely high field intensities of interest, reference is made to FIGURES 4 to 8. As shown therein the coil generally comprises a plurality of serially connected helically wound concentric layers 11 of conductor 12. Each layer 11 is structurally supported by means of a rigid cylinder 13 to resist the high magnetic forces. Projecting radially inward from each of the cylinders 13 into thermal contact with the outer periphery of the respective inwardly adjacent layer 11, there is provided wall structure defining a purality of circumferentially spaced, longitudinally extending ribs 14 with longitudinal coolant grooves 16 interposed therebetween. In addition, manifolds 17, 18 sealingly attached to the opposite ends of the coil structure are preferably arranged to interconnect the layers of coolant grooves for multilayer, multipass passage of coolant therethrough. A gas such as helium is preferably employed as the coolant and such gas is best introduced to one manifold 17 at a temperature below the optimum operating temperature and extracted from the other manifold 18 at the optimum operating temperature to be thereafter recycled through a suitable refrigeration or cryogenic plant 19 to the first manifold 17. In this manner the coil conductor 12 is maintained at substantially the optimum temperature whereat, as noted hereinbefore, minimum overall input energy is required to generate a magnetic field of given intensity with the particular conductor material.

The wall structure that defines the ribs 14 and coolant grooves 16 may be milled directly in the inner periphery of each cylinder 13. It will be appreciated, however, that by virtue of the curvature of the cylinder wall, the resulting milling operation would be extremely difficult and time consuming. Hence, to overcome this difficulty we provide means whereby the ribs and grooves are formed in a materially simplified manner. More particularly, a separate relatively thin-walled cylindrical tube 21 (see FIGURE 5) which is milled in flat condition to form the grooves and ribs prior to forming into cylindrical configuration is provided for each cylinder 13. The resulting interiorly ribbed tube 21 is then readily cemented to the interior wall surface of the corresponding cylinder 13 by means of a suitable high strength adhesive such as epoxy resin to form the desired supporting cylinder and coolant passage defining structure for each layer 11 of coil conductor.

As in the case of a conventional air core coil, the adjacent turns of each layer 11 and adjacent layers of turns must be electrically insulated from each other in the coil of the present invention. In our coil, however, the electrical insulation employed for this purpose must not constitute thermal barriers to the exchange of heat between the conductors and coolant flowing through grooves 16. Accordingly, varnish or equivalent electrical insulation is coated upon contacting portions of adjacent turns of conductor 12 of each layer to provide the requisite insulation therebetween. The insulation between the layers, however, is uniquely facilitated by the separate ribbed tubes 21 that define the coolant grooves 16. More particularly, the tubes 21 are preferably anodized to provide the electrical insulation between layers, such anodized tubes not constituting thermal barriers. While electrically insulating the adjacent layers 11, the tubes 21 nevertheless freely conduct heat generated in the conductor 12 to the coolant flowing through grooves 16 whereby the conductor is efficiently cooled to the requisite extremely low cryogenic operating temperatures.

The multilayer, multipass flow of coolant through the layers of grooves 16 adjacent the layers of coil conductor is the most efficient manner of cooling the coil structure. The particular number of layers per pass and the number of passes may be selected for a given coil size to establish optimum cooling conditions. By way of example only, the coil structure illustrated in the drawings, as is best shown in FIGURES 4 and 7, is arranged for three passes of two layers per pass to illustrate the general structure of manifolds 17, 18. It will, of course, be appreciated that substantially any number of layers per pass and number of passes may as well be employed by merely expanding the principle of manifold construction detailed hereinafter. Each of the manifolds 17, 18 is provided with concentric longitudinally projecting annular rims 22 for sealing engagement with the end faces of selected ones of cylinders 13. More particularly, radially spaced pairs of the rims 22 are disposed to bridge a number of adjacent layers of grooves 16 such that the grooves are interconnected through the annular spaces 23 between adjacent rims in a multilayer, multipass closed flow path. To this end the rims of the manifolds 17, 18 are complementary to each other. In the illustrative example mentioned hereinbefore as depicted in the drawings, the outer and intermediate rims 22a and 22b of manifold 17 bridge the outermost two layers of grooves 16 of the coil. The intermediate and inner rims 22b and 22c bridge the innermost four layers of grooves, thus interconnecting the intermediate and inner sets of two layers of the coil. The outer and intermediate rims 22d and 22e of the other manifold 18 bridge the outermost four layers of grooves whereas the intermediate and inner rims 22e and 22f bridge the innermost two layers of grooves. Hence, coolant gas introduced through an inlet conduit 24 communicating with space 23a between rims 22a, 22b of manifold 17 flows longitudinally through the grooves in the outer two layers of the coil toward the manifold 18. The space 23b between rims 22d, 22e of manifold 18 channels the gas from the outer two layers to the intermediate two layers of grooves 16 through which the gas then flows longitudinally to manifold 17 to complete the second pass. By the space 23c between rims 22b, 22c of the manifold 17, the gas is channeled to the inner pair of layers and flows therethrough to space 23d between rims 22e, 22f of manifold 18, thus completing the third pass. An outlet conduit 26 communicating with space 23d may then be employed to extract the gas from the coil for recycling through cryogenic plant 19 to inlet conduit 24.

Sealing of the rims 22 of the manifolds 17, 18 to the faces of cylinders 19 is preferably facilitated by sealing rings 27 (see FIGURE 6) of a malleable metal, such as lead or equivalent means, interposed therebetween. The sealing rings are tightly clamped between the rims and cylinder faces as by flanged connection of the manifolds to the outermost cylinders as shown generally at 28 to thereby effectively seal the spaces 23 from each other.

Inasmuch as the operating temperatures of the coil are far below room temperature, provision must be made to thermally insulate the entire coil exterior from its surroundings. To this end the coil structure is encased within an insulating shell 29 of a super insulator such as multiple layers of mylar coated with aluminum contained in an evacuated space. Electrical lead-in conductors 31, 32 are connected to the opposite ends of conductor 12 and lead exteriorly through the end wall of the manifold 18 and portion of insulating shell 29 in contact therewith. It is to be noted in this connection, that conductors 31, 32, inasmuch as they penetrate the shell 29, constitute heat leaks to the coil interior. Hence in some instances, it is desirable that the leads 31, 32 be cooled as by means of a liquid nitrogen jacket (not shown) positioned about the leads at their points of departure from the insulating shell. Where relatively large coils are involved, however, the quantity of heat entering the coil through the lead-in conductors is sufficiently small relative to the heat extracted from the coil by cooling as to be negligible.

At the extremely low operating temperatures of the coil of the present invention, the amount of heat dissipation is relatively small. Moreover, the thermal conductivity of the conductors is materially higher than at room temperature such that highly efficient transfer of heat to the cooling system results. Accordingly, the cryogenic plant 19 of previous mention may be a realtively simple gas cooling system such as the helium system depicted schematically in FIGURE 8. As shown therein, helium is extracted at the optimum operating temperature from the coil through outlet conduit 26 and raised to room temperature by passage through a succession of heat exchangers 33, 34, and 36. These heat exchangers also serve to cool the gas from room temperature to a low temperature for application to a heat engine 37 which cools the gas to a temperature slightly lower than the operating temperature for application to inlet conduit 24 to the coil. More specifically, the helium is passed serially through one side of each exchanger 33, 34, and 36 to a pair of compressors 38, 39 having a water cooled heat exchanger 40 connected therebetween. The second compressor 39 is connected through a second water cooled heat exchanger 41 to the second side of heat exchanger 36 which is in turn connected to the serially connected second sides of exchangers 34, 33, the latter one of which is connected to heat engine 37. Hence, the exchangers 33, 34, and 36 heat the helium to room temperature by cooling the helium subsequent to compression in compressors 38, 39 to a low temperature suitable for input to heat engine 37. A second heat engine 42 may be advantageously connected between the input to the second side of exchanger 34 and input to the first side thereof to equalize the temperature difference therebetween. The specific embodiment of the cryogenic plant 19 just described is substantially similar to a helium liquefier except that liquid temperature is never reached.

It will be appreciated that at the cryogenic operating temperatures employed in our coil structure, the ultimate tensile and yield strengths of most all metals increase by a factor of approximately two compared to their values at room temperatures. Both copper and aluminum have sufficient strengths at their optimum operating temperatures that these metals may be employed as the coil conductor 12 without reinforcement other than cylinders 13 to withstand the substantial magnetic forces generated in the coil. With the preferred sodium conductor, however, additional reinforcement is required. As best shown in FIGURE 7 of the drawings, the conductor reinforcement is provided by thin walled tubing 43 of steel or the like within which the sodium is cast as a continuous conductor. More particularly, the tubing 43 is preferably of square cross section and is formed into a separate helix for each layer 11 of conductor. Continuity between the end of one helical layer of sodium conductor and the end of an adjacent layer is facilitated by a jumper 44 of unique construction (see FIGURE 6). Each jumper 44 preferably comprises a rectangular cup-like base member 46 with a cover plate 47 secured thereto, both base and cover being of steel or the like. The cover plate 47 is provided with spaced apertures 48, 49 which are arranged to receive in sealed relation tubular stubs 51 projecting from the ends of adjacent layers of tubing 43 and communicating with the interiors thereof (see FIGURE 7). The apertures 48, 49 and hollow interior of base member 46 define a bridging passage of substantially the same cross-sectional area as the interior cross section of the tubing. Sodium cast within the layers of tubing also fills the bridging passage of the jumper 44 whereby continuity between layers of the sodium conductor is attained. The jumpers 44 are secured to the manifolds 17, 18 preferably in flush position with the frontal surfaces of rims 22. Where a jumper bridges layers of tubing on radially opposite sides of a rim, the rim is notched as shown generally at 52 (see FIGURE 6) to receive the jumper with the face of its cover plate 47 flush with the rim surface. The sealing rings 27 disposed between the rims 22 and faces of cylinders 19 hence pass over the face of the cover plate 47 of any jumpers 44 recessed in the rims. In addition, a sealing strip 53 of lead or other malleable metal is interposed between each recessed jumper and the walls of the corresponding notch 52.

Where a jumper 44 bridges layers of tubing within the same space 23 between a pair of rims 22, the jumper is merely secured to the face of the manifold in flush position with the frontal surface of the rims. In either case whether a jumper is recessed in a rim or secured to the face of a manifold, it will be appreciated that in bridging adjacent layers of tubing, the jumper is in end abutment with several of the ribs 14 of whatever layers thereof are traversed by the jumper. The cooling grooves 16 between these ribs wolud hence be blocked in the absence of transverse grooves 54 in the face of the cover plate 47 at positions opposite the traversed layers of ribs 14. Communication between the spaces 23 and coolant grooves 16 terminating in the space and underlying the jumpers 44 is thereby provided by the grooves 54. The jumpers 44 may be alternatively positioned in spaced relation to the end surfaces of the rims 22 rather than flush therewith to facilitate free communication between the grooves 16 and spaces 23 without necessity of the grooves 54 in the jumpers.

The parameters of a cryogenic coil of the variety detailed hereinbefore may vary considerably depending upon the particular application in which it is employed. Hence by way of example only, the following are preferred parameters of a coil for generating a central field of the order of 100,000 gauss:

| | |
|---|---|
| Inside diameter | 20 inches. |
| Outside diameter | 60 inches. |
| Length | 40 inches. |
| Current density | 5400 amps per sq. cm. |
| Current | 14,000 amps. |
| Conductor | ⅝ square x .010 wall stainless steel tubing filled with sodium. |
| Inductance | .18 henry. |
| Resistance (under load) | $1.26 \times 10^{-4}$ ohms. |
| Time constant (under load) | 51 min. |
| Volts | 1.8 volts. |
| Energy in field | $1.7 \times 10^7$ joules. |
| Heat generation rate | .04 watt per cc. |
| Total power | 25 kw. |
| Coolant | 1 kg. per sec. of helium gas at 5 atm. pressure and about 7° K. |
| Coolant passage | ⅛ inch wide x .050 inch deep. |
| Number of layers | 15. |
| Number of turns | 41 per layer, 615 total. |
| Coolant makes 3 passes of 5 layers each. | |
| Coolant pressure drop | .5 p.s.i. |
| Coolant velocity | 35 ft. per sec. at inlet and 130 ft. per sec. at outlet. |
| Average ΔT for heat transfer in coil | 1.7° K. (⅓ in .010 inch tube wall and ⅔ in gas). |
| Sodium required | 1500 lbs. |
| Maximum magnetic bursting pressure | 1500 p.s.i. |
| Structural support | 15 stainless steel cylinders from .35 to .12 inch thick. |
| Space factor | 65%. |

While the invention has been disclosed with respect to a single preferred embodiment, it will be apparent to those skilled in the art that numerous variations and modifications may be made within the spirit and scope of the invention and thus it is not intended to limit the invention except as defined in the following claims.

What we claim is:

1. A cryogenic coil comprising at least one helical layer of conductor adapted for connection to a current source; and refrigeration means disposed in heat conductive relation to said layers of conductor and maintaining same at an operating temperature, $T_o$; said conductor of a material having a resistivity, $\rho(T_o)$, at said operating temperature, $T_o$, for which the ratio $$\frac{\rho(T_o)}{\rho_s}\left[1+\frac{1}{\eta}\frac{T_h-T_o}{T_o}\right]$$

is significantly less than one, where $\rho_s$ is the resistivity of copper at ambient temperature, $\eta$ is the efficiency of said refrigeration means, and $T_h$ is the heat rejection temperature of said refrigeration means; said operating temperature $T_o$, being the temperature at which the curve of the ratio $$\frac{\rho(T_o)}{\rho_s}\left[1+\frac{1}{\eta}\frac{T_h-T_o}{T_o}\right]$$

as a function of operating temperatures exhibits a minimum.

2. A cryogenic coil according to claim 1, further defined by the material of said conductor being copper and said operating temperature, $T_o$, being 33° Kelvin.

3. A cryogenic coil according to claim 1, further defined by the material of said conductor being zone-refined aluminum and said operating temperature, $T_o$, being 13° Kelvin.

4. A cryogenic coil according to claim 1, further defined by the material of said conductor being sodium and said operating temperature, $T_o$, being 10° Kelvin.

5. A cryogenic coil comprising a plurality of serially connected helically wound concentric layers of conductor, a plurality of rigid support cylinders respectively concentrically interposed between said layers of conductor, said cylinders having circumferentially spaced ribs projecting radially into thermal contact with said layers of conductor and defining a plurality of longitudinally extending passages about each layer, electrical insulation means interposed between the adjacent turns of each layer and between adjacent layers with at least the insulation means between the adjacent layers being freely conductive of heat, a cryogenic plant coupled to said passages for circulating coolant therethrough, and a thermal insulating shell disposed about the coil exterior to define a thermal barrier between the coil and its surroundings, said conductor being of a material having a resistivity, $\rho(T_o)$, at a temperature, $T_o$, for which the ratio $$\frac{\rho(T_o)}{\rho_s}\left[1+\frac{1}{\eta}\frac{T_h-T_o}{T_o}\right]$$

has a minimum value equal to a small fraction of 1, $\rho_s$ being the resistivity of copper at ambient temperature, $\eta$ being the efficiency of said cryogenic plant, and $T_h$ being the heat rejection temperature of said cryogenic plant, said cryogenic plant maintaining the temperature of said coolant at exit from said passages equal to, $T_o$, and at entrance to said passages equal to several degrees Kelvin less than, $T_o$.

6. A cryogenic coil comprising a plurality of serially connected helically wound concentric layers of conductor, a plurality of rigid support cylinders respectively concentrically interposed between said layers, a plurality of anodized interiorly longitudinally ribbed tubes respectively secured to the interior wall surfaces of said cylinders with the ribs radially projecting into contact with said layers of conductor and defining concentric layers of coolant passages about the layers of conductor, electrical insulation means interposed between the adjacent turns of each layer of conductor, inlet and outlet means communicating with said coolant passages, a gas cooling system coupled between said inlet and outlet means for introducing gas to the former and receiving gas from the latter for cooling and recycling, and a thermal barrier enclosing the exterior peripheral surfaces of the inner and outer cylinders and the ends of all of said cylinders.

7. A cryogenic coil according to claim 6, further defined by the diameter of the outermost layer of conductor being three times the diameter of the innermost layer and the length of said layers of conductor being twice the diameter of the innermost layer thereof.

8. A cryogenic coil comprising a plurality of concentric helical layers of thin-walled tubing, means communicably connecting the ends of adjacent layers of said tubing to form a continuous passage serially therethrough, a continuous conductor of sodium filling said passage, a plurality of rigid support cylinders respectively concentrically interposed between said layers of tubing, a plurality of anodized interiorly longitudinally ribbed tubes respectively secured to the interior wall surfaces of said cylinders with the ribs projecting radially into contact with said layers of tubing and defining concentric layers of coolant passages about the layers of tubing, electrical insulation interposed between adjacent turns of each layer of tubing, a helium cooling plant connected in series with said coolant passages and continuously circulating low temperature helium therethrough, and a thermal insulating shell surrounding the exterior surfaces of the coil.

9. A cryogenic coil according to claim 8, further defined by said means communicably connecting the ends of adjacent layers of tubing each comprising a jumper having a rectangular cup-like base with a cover plate secured thereto, said cover plate having spaced apertures defining with the hollow interior of the base a bridging passage of the same cross-sectional area as the interior cross section of the tubing, and tubular stubs communicably projecting from the ends of adjacent layers of tubing and enclosed in sealed relation within said apertures.

10. A cryogenic coil comprising a plurality of concentric helical layers of thin-walled tubing of square cross section, a plurality of rigid support cylinders respectively concentrically interposed between said layers of tubing, a plurality of anodized interiorly longitudinally ribbed tubes respectively secured to the interior wall surfaces of said cylinders with the ribs projecting radially into contact with said layers of tubing and defining concentric layers of coolant passages about the layers of tubing, electrical insulation interposed between adjacent turns of each layer of tubing, a plurality of jumpers each having a rectangular cup-like base with a cover plate secured thereto, said cover plate having spaced apertures defining with the hollow interior of the base a bridging passage of the same cross-sectional area as the interior cross-section of said tubing, said jumpers connected with their bridging passages in communication with the ends of adjacent layers of said tubing to form a continuous passage serially therethrough, a continuous conductor of sodium filling said continuous passage, complementary manifolds secured in sealed relation to the ends of said cylinders and defining therewith a multilayer multipass flow path through said coolant passages, a helium cryogenic cooling plant communicably coupled between said manifolds to continuously circulate low temperature helium through said multilayer multipass flow path, and a shell of super thermal insulating material surrounding the exterior surfaces of the coil.

11. A cryogenic coil according to claim 8, further defined by the temperature of helium at introduction to said coolant passages being 7° Kelvin and the temperature at extraction therefrom being 10° Kelvin.

References Cited in the file of this patent

UNITED STATES PATENTS

| | | |
|---|---|---|
| 2,388,565 | Paluev | Nov. 6, 1945 |
| 2,422,037 | Paluev | June 10, 1947 |
| 2,866,842 | Matthias | Dec. 30, 1958 |
| 2,935,694 | Schmitt et al. | May 3, 1960 |

OTHER REFERENCES

Swenson et al.: "Low Temperature Electronics," Proceeding of the I.R.E., February 1945; pp. 408, 413.